United States Patent Office 3,785,916
Patented Jan. 15, 1974

3,785,916
THERMOPLASTIC COMPOSITIONS
Cecil Nigel Turton, Darien, Conn., and James McAinsh, Northwich, England, assignors to Imperial Chemical Industries Limited, London, England
No Drawing. Filed Nov. 9, 1971, Ser. No. 197,169
Claims priority, application Great Britain, Nov. 12, 1970, 53,836/70; May 25, 1971, 16,874/71
Int. Cl. B29c 27/00
U.S. Cl. 161—156
5 Claims

ABSTRACT OF THE DISCLOSURE

A composite having an aromatic polymer matrix reinforced by carbon fibres having length at least 2.5 cm.

---

This invention relates to thermoplastic composites and in particular to carbon fibre reinforced thermoplastic composites.

Carbon fibres have very high stiffness to weight ratios, and have been extensively used as reinforcement in composite materials. In general, the matrix materials used in conjunction with carbon fibres have been thermosetting resins which before curing may be applied to the fibres in the form of a liquid of relatively low viscosity, thereby achieving easy wetting of the fibres and low void content in the cured composites. The high melt viscosity of thermoplastics, however, tends to make impregnation of long fibre bundles with a thermoplastic melt extremely difficult, giving poor wetting and low interlaminar shear strength of the final composite. Consequently, composites of thermoplastics reinforced by carbon fibres have generally contained short fibres (0.1 to 10 mm. in length), and have been fabricated by normal thermoplastic techniques, for example extrusion and injection moulding.

According to the present invention, a composite is provided having an aromatic polymer matrix reinforced by long carbon fibres.

Aromatic polymers and methods for making them, are described in British patent specifications 971,227; 1,016,-245; 1,060,546; 1,078,234; 1,102,679; 1,109,842; 1,122,-192; 1,124,200; 1,133,561; ,153,035; 1,153,528; 1,164,817; 1,177,183, and 1,234,301; Belgian specification 741,965; Canadian specification 847,963; U.S. specification 3,432,-468; Netherlands specifications 6903070 and 7011346; German specification 1,938,806 and Swiss specification 491,981, the disclosures of which are incorporated herein by reference.

The aromatic polymers described in the abovementioned specifications comprise repeating units of the formula —Ar—X— in which Tr is a bivalent aromatic radical and X is a —CO— or —SO$_2$— group and each may vary from unit to unit in the polymer chain (so as to form copolymers of various kinds). Thermoplastic aromatic polymers generally have at least some units of the structure

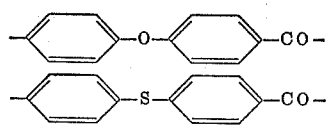

in which Y is oxygen or sulphur or the residue of an aromatic diol such as 4,4'-bisphenol. One example of such a polymer has repeating units of the formula

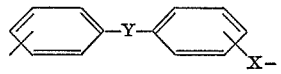

others have repeating units of the formulae

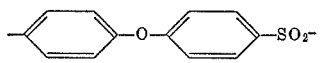

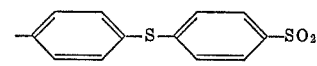

and others (which are commercially available in the United States of America) are said to have repeating units of the formula

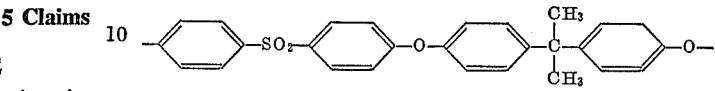

(Union Carbide Corporation) or copolymerized units in various proportions of the formulae

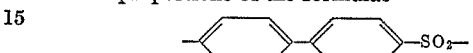

and

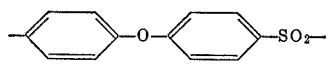

(Minnesota Mining and Manufacturing Company). Another group of aromatic polymers has repeating units of the formula

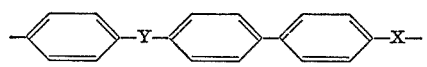

(where Y is oxygen or sulphur and X is —CO— or —SO$_2$—) which may be copolymerized with units of other formulae given above.

Carbon fibres may be produced from a fibre of synthetic polymer material such as for example polyacrylonitrile or regenerated cellulose, or from materials such as pitch, by methods such as are described for example in British specifications 1,071,400; 1,110,791; 1,166,251; and 1,166,-252. By "long fibres" we mean fibres having a length not less than 2.5 cm. and preferably greater than 20 cm. conveniently about 35 cm. The fibres may be substantially continuous; that is, there is no upper limit upon the length of fibres which may be used according to the invention. The maximum length of fibre is governed by the method of production. The fibres may be in the form of tows, rovings, mat, felt or fabric and may be randomly arranged or oriented in one or more directions.

The carbon fibre may be impregnated according to the method of the invention by any convenient method such as for example by a solution of the polymer in a volatile solvent or by molten polymer. It is possible to extrude aromatic polysulphone on to a moving warp of carbon fibre but such a method may lead to poor "wetting" of the carbon fibre and hence poor adhesion. If solution impregnation is used it is preferable to ensure that substantially all the solvent is evaporated before further processing since residual solvent can lead to blistering. It is preferable to use a volatile solvent, suitably methylene chloride and chloroform. However if the polymer is not soluble in such a solvent, then solvents having higher boiling point may be used provided that the solvent is unreactive towards carbon fibre.

It has been found that certain aromatic polymers particularly polysulphones are especially suitable as matrix materials for long carbon fibre composites, generally giving composites with surprisingly good physical properties, in particular interlaminar shear strength, flexural strength and modulus and resistance to impact damage.

According to another aspect of the invention a method is provided for producing a composite having improved interlaminar shear strength and resistance to impact damage comprising impregnating long carbon fibres with a solution of at least one aromatic polysulphone, to form a prepreg and compression moulding the resulting prepreg. It is preferable that the prepreg is formed by solution impregnation in which case the solvent is removed before compression moulding.

Long carbon fibre composites with the preferred aromatic polysulphones as matrices, prepared according to the method of the invention, are generally superior to composites with thermosetting matrices, for example epoxy resins, both in resistance to impact damage and in interlaminar shear strength. According to the method of the invention, the carbon fibres are impregnated with a solution of an aromatic polymer in a volatile solvent, for example methylene chloride. The concentration of polymer in the solvent must not be so high as to render the solution too viscous to allow good wetting of the fibres, and should not be so dilute that excessive quantities of solvent must be removed. A concentration of between 50 g. and 150 g./dm.$^3$ is preferred. Any suitable means of impregnation may be used, such as for example dip coating, spraying, brushing, or the use of doctor blades, rollers and the like. The fibre bundles to be impregnated may be preformed into any shape or thickness, but to facilitate solvent removal and subsequent moulding, they are preferably in the form of thin sheets, tapes, mats or cloths, which on drying give thin prepreg sheets.

The volatile solvent is removed by drying in air or vacuum, preferably at a temperature above the boiling point of the solvent employed. It is preferred to remove substantially all the solvent in order to prevent blistering during compression moulding; it is preferable that at least the final stage of drying should be carried out at below atmospheric pressure. The solvent may be recovered and recycled. The quantity of polysulphone resin present in the dried impregnated fibre bundles suitably is sufficient to fill completely all the spaces between the fibres on moulding, but if the proportion of polymer is too large excessive quantities of resin may be squeezed out during the moulding process. Preferably the prepregs should contain between 10% and 50% by weight of resin, most preferably 25 to 35%.

The dried impregnated fibre bundles are then placed in a compression mould. If thin prepreg sheets have been made as described above, they may be cut to the shape of the mould and stacked one on top of the other in the mould until the requisite quantity of material has been added. The mould is then closed and pressed at a temperature above the softening point of the polysulphone. It is generally found that the properties of the final moulded article are improved if the moulding time or the moulding temperature is increased, provided that the combination of time and temperature used is not such that the resin is appreciably degraded. The effect of increased moulding pressure is to improve product properties up to a point beyond which there may be some deterioration again. The use of a stopped mould may be advantageous in preventing the application of an excessive pressure.

A composite of the invention can be thermoformed into a desired shape. The composites have the excellent high temperature properties of aromatic polysulphones and greatly increased stiffness, dimensional stability and tensile and impact strength. Such properties render the composites useful as load bearing components such as for example bearings, rolling element, machine slideways and piston rings and turbine blades.

The invention is illustrated with reference to the following examples.

EXAMPLE 1

A sample (7 g.) of aromatic polyethersulphone prepared by a method similar to that described in Example 3 of British specification 1,153,035 having repeating units of the formula

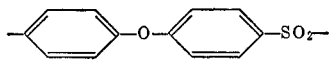

and a reduced viscosity of 0.43 (measured at 25° C. on a solution in dimethyl formamide containing 1 g. of polysulphone in 100 cm.$^3$ of solution) was dissolved in 63 cm.$^3$ of methylene chloride. Carbon fibres (Courtaulds Ltd., Type B) were cut into 35 cm. lengths and a portion (10.5 g.) was placed over a rectangular area (35 cm. x 24 cm.), on an enameled steel tray. The polysulphone solution was poured over the fibres and spread out using a rubber roller to give a uniform layer which completely wet the fibres. The resulting composite was dried out firstly at room temperature in a dry atmosphere to avoid condensation of water and then under a hot air blower. The composite was finally dried in a vacuum at 120° C. to remove the last traces of methylene chloride.

A similar composite could be prepared using as polyether sulphone, a polymer (Union Carbide Corporation) said to have repeating units

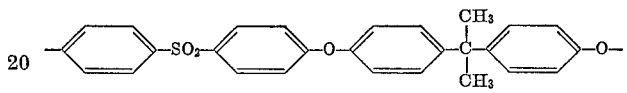

EXAMPLE 2

A sample of the aromatic polyether sulphone of Example 1 (100 g.) was dissolved in methylene chloride (1 dm.$^3$) to give a 10% wt./vol. solution. The solution was applied from a syringe to pieces of aligned continuous carbon fibre tape, 122 cm. x 7.6 cm., 50 cm.$^3$ of solution being applied to each piece.

The carbon fibre used was Rolls Royce Type II, of tensile modulus 184±20 GN m.$^{-2}$ and tensile strength 1.73±0.64 GN m.$^{-2}$. The solvent was allowed to evaporate in air, and the prepeg tape was then dried under vacuum at 120° C. for 16 hours. A stack of 25 layers of prepreg sheets were then compression moulded at a pressure of 15 MN m.$^{-2}$ for 2 hours. The temperature of the mould was 320° C., 95° C. above the glass transition point of the resin, which is 225° C.

The interlaminar shear strength of the composite was determined using a 16 mm. x 6 mm. x 2.5 mm. sample on a span of 12.7 mm.; i.e. a 5:1 span:depth ratio. The loading nose diameter was 6.4 mm. and the crosshead speed of the "E" type Tensometer was 5.0 mm./minute. The mean of at least four determinations was taken.

The flexural strength and modulus were determined using a 76 mm. x 9 mm. x 2.5 mm. sample, with a span:depth ratio of approx. 25:1.

The fibre content of the composite was determined by dissolving the matrix resin with methylene chloride, collecting and weighing the residual fibres.

The resistance to impact damage was determined by dropping a weighted slider upon a sample of dimensions 70 mm. x 12.7 mm. x 2.5 mm. The sample was supported on two parallel cylindrical rods of 10 mm. diameter, 50 mm. apart, and was struck centrally by a third rod of the same diameter mounted upon the slider parallel to the two supporting rods. Samples were subjected to increasing impact and the impact energy required to cause visual damage to the test sample was measured, as was the impact energy required to break the sample.

EXAMPLE 3

Bakelite polysulfone P1700 (Union Carbide Corp.) said to have repeating units of the formula

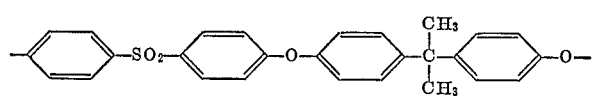

was dissolved in methylene chloride to give 10% wt./vol. solution and composites made as described in Example 2. The moulding temperature was 260° C., 85° above the glass transition temperature of 175° C. Interlaminar shear strength and flexural properties were measured as in Example 2 and are presented below in Table 1.

EXAMPLE 4

20 g. of "Epikote" DX210 (Shell Chemical Co. Ltd.), an epoxy resin specifically designed as a matrix for carbon fibre composites, was dissolved in dry Analar acetone (76 cm.$^3$), and 0.48 g. boron trifluoride (Epikure 400—Shell Chemical Co. Ltd.) was added. A portion (30 cm.$^3$) of the resulting solution was used to impregnate each 122 cm. x 7.6 cm. carbon fibre tape, and the acetone was allowed to evaporate for 5 days at room temperature to form prepregs.

The shaped, dried prepregs were heated in an air oven at 120° C. for 20 minutes then a stack of 25 prepreg layers was compression moulded at 190° C. for 4 hours at a pressure of 6.5 MN m.$^{-2}$. Interlaminar shear strength, flexural properties and impact resistance were measured as dtscribed in Example 2 and are presented below in the following table by way of comparison.

|  | Resin | | |
| --- | --- | --- | --- |
|  | Polyether-sulphone, Ex. 2 | Polysulfone (Union Carbide Corp.), Ex. 3 | "Epikote" DX210 (Shell Chemical Co. Ltd.), Ex. 4 |
| Percent resin by wt | 31.2 | 25.9 | 30.0 |
| Interlaminar shear strength (MN m.$^{-2}$) | 92.4 | 72.0 | 68.0 |
| Flexural modulus (GN m.$^{-2}$) | 103 | 86 | 128 |
| Flexural strength (GN m.$^{-2}$) | 1.22 | 1.16 | 1.29 |
| Impact energy (kJ m.$^{-2}$): |  |  |  |
| (a) To initiate damage | 62 |  | 18 |
| (b) For complete break | 65 |  | 55 |

We claim:

1. A method of preparing a composite having a thermoplastic aromatic polymer matrix reinforced by carbon fibres having length at least 2.5 cm. comprising, impregnating the carbon fibre with a solution of the thermoplastic aromatic polymer dissolved in a volatile solvent, evaporating the solvent and thereafter compression-moulding the impregnated carbon fibre.

2. A method according to claim 1 in which the thermoplastic aromatic polymer is an aromatic polysulphone.

3. A method according to claim 1 in which the carbon fibres have a length greater than 20 cm.

4. A multiply laminate comprising at least two composites made by the method of claim 1.

5. A composite made by the method of claim 1.

References Cited
UNITED STATES PATENTS 3,301,742    1/1967    Noland et al.    161—170
3,674,581    7/1972    Kalnin et al.    161—170 UX WILLIAM J. VAN BALEN, Primary Examiner U.S. Cl. X.R.

156—166, 243; 161—170, 247

UNITED STATES PATENT OFFICE
CERTIFICATE OF CORRECTION

Patent No. 3,785,916          Dated January 15, 1974

Inventor(s) Cecil Nigel Turton et al

It is certified that error appears in the above-identified patent and that said Letters Patent are hereby corrected as shown below:

1) Column 1, line 53, "Tr" should read --Ar--.

2) Column 1, line 70, a linking bond should be inserted after "SO$_2$" to read:

Signed and sealed this 16th day of July 1974.

(SEAL)
Attest:

McCOY M. GIBSON, JR.
Attesting Officer

C. MARSHALL DANN
Commissioner of Patents